No. 686,702.  
W. E. BEMIS.  
RUNNING GEAR FOR VEHICLES.  
(Application filed Mar. 9, 1901.)  
Patented Nov. 19, 1901.

(No Model.) 2 Sheets—Sheet 1.

Witnesses  
Inventor  
Wm. E. Bemis,  
By  
Attorneys

THE NORRIS PETERS CO., PHOTO-LITHO., WASHINGTON, D. C.

No. 686,702. Patented Nov. 19, 1901.
W. E. BEMIS.
RUNNING GEAR FOR VEHICLES.
(Application filed Mar. 9, 1901.)
(No Model.) 2 Sheets—Sheet 2.
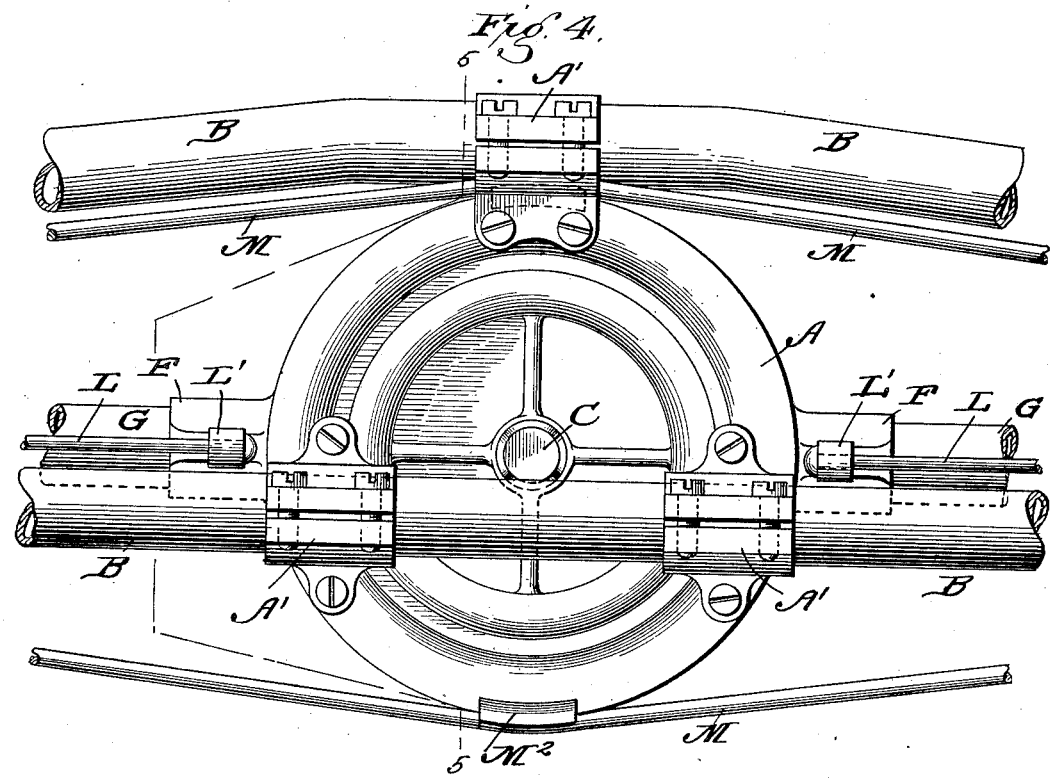
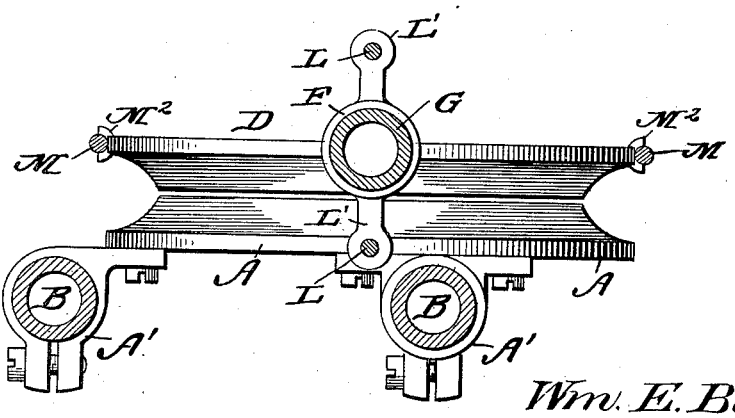
Witnesses
J. C. Shaw
Clarence Shaw
Inventor
Wm. E. Bemis
By
Attorneys
THE NORRIS PETERS CO., PHOTO-LITHO., WASHINGTON, D. C.

UNITED STATES PATENT OFFICE.

WILLIAM ELEAZER BEMIS, OF FITCHBURG, MASSACHUSETTS.

RUNNING-GEAR FOR VEHICLES.

SPECIFICATION forming part of Letters Patent No. 686,702, dated November 19, 1901.

Application filed March 9, 1901. Serial No. 50,457. (No model.)

*To all whom it may concern:*

Be it known that I, WILLIAM ELEAZER BEMIS, a citizen of the United States, residing at Fitchburg, in the county of Worcester and State of Massachusetts, have invented a new and useful Front Running-Gear for Vehicles, of which the following is a specification.

This invention relates generally to a vehicle running-gear, and more particularly to the front gear of an automobile, the object being to provide a simple and efficient form of gear which can be applied to any of the vehicles now in use and whose main purpose and advantage will be the automatic accommodation of the gear to rough or uneven roads. At the present time when one wheel runs upon a rough or uneven portion of road the roughness is imparted to the opposite wheel and also to the body of the vehicle. The main object and purpose of my gear is to avoid this; and with this end in view my invention consists, broadly, in pivotally supporting a plate beneath the body of the vehicle, connecting axle-sections to opposite sides of the said plate, each axle-section being braced by tie-rods and coupled at the outer ends to stub-axles, and in providing truss-rods, which are passed partially around the plate upon opposite sides and connected to the ends of the sectional axle.

The invention consists also in providing antifriction bearing devices between the pivoted plate and its support, and the invention likewise comprehends certain details of construction and novelties of combination, all of which will be fully described hereinafter and pointed out in the claims.

Figure 1:
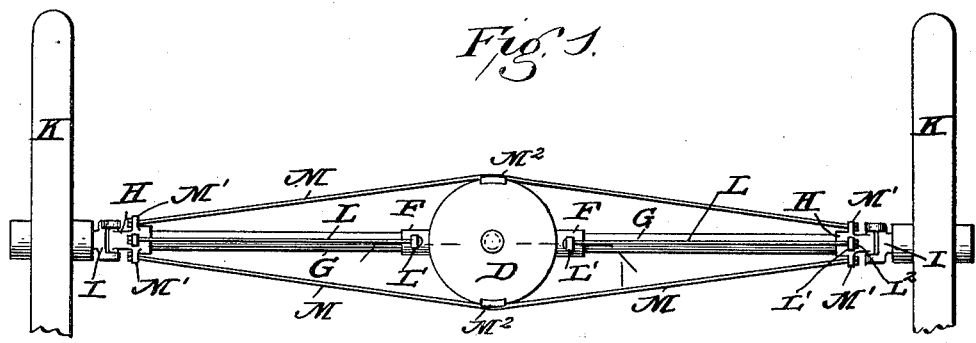
Figure 2:
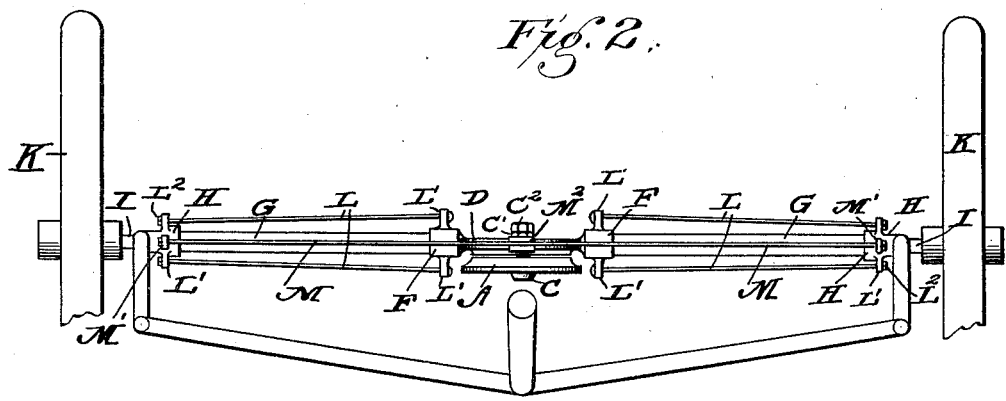
Figure 3:
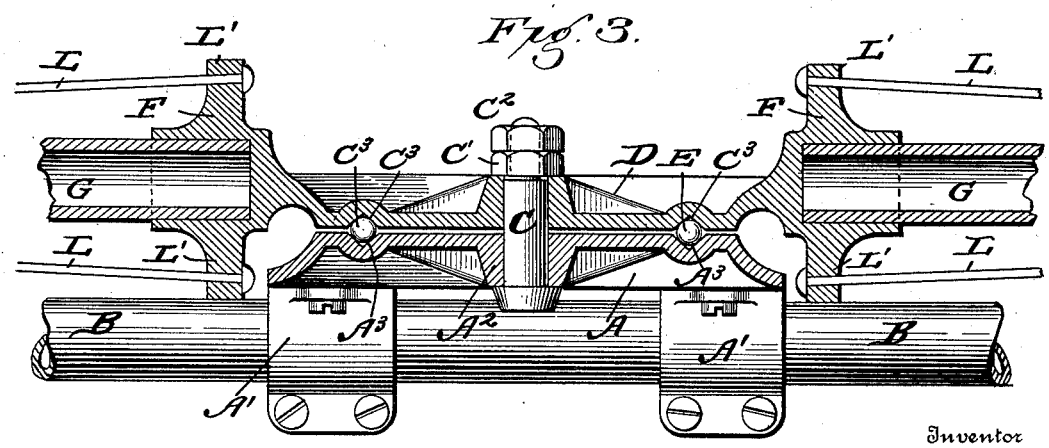

In the drawings forming part of this specification, Figure 1 is a front elevation of my improved form of gear, the wheels being shown in part only. Fig. 2 is a top plan view. Fig. 3 is an enlarged section on the line 3 3 of Fig. 1. Fig. 4 is an enlarged detail elevation showing the means for connecting the gear to the vehicle, and Fig. 5 shows the same parts partly in section. The line 5 5 indicates the plane of said section.

In carrying out my invention I employ a circular bearing-plate A, which is rigidly attached to the tubes or bars B by means of clips A', said tubes or bars being securely fastened to the bottom of the vehicle; but as this forms no part of the invention I have not shown the vehicle nor the special means for connecting the tubes thereto. The plate A is formed with a hub $A^2$, through which passes a pivot-bolt C, upon which a plate D turns, said plate D corresponding in size and general shape with the plate A and is held upon the bolt C by means of nuts C' and $C^2$. The contiguous faces of the plates A and D are formed with mating annular grooves $A^3$ and $C^3$, respectively, for the purpose of receiving the antifriction-balls E, which relieves the strain and steadies the motion of the plate D upon the pivot-bolt C. The plate D has two oppositely-disposed sockets F F, formed integral therewith, each socket receiving the inner end of a tubular axle-section G, the outer ends of the axle-sections fitting into the sockets H, which are pivotally coupled to stub-axles I, carrying the wheels K. The sockets and axle-sections are securely fastened together by means of the rods L, which pass through the lugs L', projecting laterally from the sockets, and tension is secured by means of nuts $L^2$, secured upon the ends of the rods. This makes an exceedingly light but rigid axle construction. Truss-rods M M extend above and below the plate D, said rods passing partially around the plate at diametrically opposite points, bridging upon the plate at said points, and the ends of said truss-rods are connected to the coupling-sockets H by means of lugs M' M', as most clearly shown in Fig. 1, tension being secured by means of nuts screwed upon the ends of the truss-rods. The periphery of the plate D is somewhat enlarged and grooved, as shown at $M^2$, for the purpose of forming firm seats for the truss-rods, and thereby prevent displacement.

Steering devices are connected to the stub-axles of the wheels, but as they form no part of the present invention a detail description thereof will not be necessary.

From the description of the construction of the various parts it will be observed that the axle is virtually pivoted horizontally upon the bolt C, inasmuch as the pivot-plate D and sectional axles virtually constitute a single axle. By pivotally supporting the axle in this manner and arranging truss-rods the wheels will automatically accommodate themselves to any roughness or unevenness of the road without transmitting the motion to the body of the vehicle, thereby permitting the vehicle to move along with the uniform motion at an increased rate of speed, it not being necessary to slacken the speed on account of the roughness of the road.

Having thus fully described my invention, what I claim as new, and desire to secure by Letters Patent, is—

1. In a vehicle, a plate rigidly supported below the body thereof, a plate pivotally supported upon said other plate having diametrically opposite grooved peripheral enlargements, and truss-rods connected with the axles and lying at their centers in the grooves in said enlargements, substantially as described.

2. In a vehicle, two substantially similar circular plates having complemental annular grooves on their adjacent faces and horizontally pivoted, one of said plates being rigid and the other having superposed peripheral, grooved enlargements, balls in said grooves, socket members on the movable plate, stub-axles also having socket members, axle-sections fitted in the respective socket members, and truss-rods lying at their centers in the grooves of said enlargements and connected at their ends to the socket members of the pivoted plate and stub-axles respectively, substantially as described.

3. The combination with a plate rigidly supported beneath the body of a vehicle and having a central pivotal bolt passing therethrough, of a plate pivotally supported upon said bolt and having sockets integral therewith, the axle-sections arranged in the said sockets and having coupling-sockets at their outer ends, the said sockets being connected by means of tie-rods, the truss-rods passing partially around the pivot-plate upon opposite sides and connected at their opposite ends to the coupling-sockets, the fixed and pivot plates having mating annular grooves, and the antifriction-balls arranged therein, substantially as described.

WILLIAM ELEAZER BEMIS.

Witnesses:
JENNIE H. GRAMO,
GEORGE O. ALLEN.